US007376505B2

(12) United States Patent
Skala et al.

(10) Patent No.: US 7,376,505 B2
(45) Date of Patent: May 20, 2008

(54) METHOD AND DEVICE FOR OPERATING AN INTERNAL COMBUSTION ENGINE

(75) Inventors: Peter Skala, Tamm (DE); Horst Wagner, Stuttgart (DE); Ruediger Fehrmann, Leonberg (DE); Maik Schaufler, Hohenacker (DE)

(73) Assignee: Robert Bosch GmbH, Stuttgart (DE)

( * ) Notice: Subject to any disclaimer, the term of this patent is extended or adjusted under 35 U.S.C. 154(b) by 201 days.

(21) Appl. No.: 11/454,375

(22) Filed: Jun. 15, 2006

(65) Prior Publication Data

US 2006/0287803 A1 Dec. 21, 2006

(30) Foreign Application Priority Data

Jun. 15, 2005 (DE) ...................... 10 2005 027 650

(51) Int. Cl.
*G06F 19/00* (2006.01)
*F02P 5/00* (2006.01)

(52) U.S. Cl. ................... 701/110; 701/111; 123/406.23

(58) Field of Classification Search ................ 701/100, 701/101, 110, 111, 114, 115; 123/406.23, 123/406.24
See application file for complete search history.

(56) References Cited

U.S. PATENT DOCUMENTS

| | | | | |
|---|---|---|---|---|
| 6,109,237 | A * | 8/2000 | Pels et al. | 123/339.19 |
| 6,665,607 | B2 * | 12/2003 | Skala et al. | 701/114 |
| 7,051,058 | B2 * | 5/2006 | Wagner et al. | 708/300 |
| 2004/0077458 | A1 * | 4/2004 | Hartmann et al. | 477/101 |
| 2006/0030996 | A1 * | 2/2006 | Wagner et al. | 701/103 |
| 2006/0064226 | A1 * | 3/2006 | Damitz et al. | 701/103 |
| 2006/0282209 | A1 * | 12/2006 | Skala et al. | 701/103 |

* cited by examiner

*Primary Examiner*—John T Kwon
(74) *Attorney, Agent, or Firm*—Kenyon & Kenyon LLP

(57) ABSTRACT

A method and a device for operating an internal combustion engine, in particular a motor vehicle having a plurality of cylinder banks are described, making it possible to eliminate fluctuations in a time trend in an output quantity of the internal combustion engine that may result due to differences in operation of different cylinder banks of the internal combustion engine. A characteristic value of the output quantity of the internal combustion engine is determined repeatedly over time. The thus formed time trend in the characteristic value for the output quantity of the internal combustion engine is filtered as a function of the operation of the cylinder banks.

12 Claims, 2 Drawing Sheets

METHOD AND DEVICE FOR OPERATING AN INTERNAL COMBUSTION ENGINE

FIELD OF THE INVENTION

The present invention is directed to a method and a device for operating an internal combustion engine.

BACKGROUND INFORMATION

Methods and devices for operating an internal combustion engine are already known. Such an internal combustion engine drives a motor vehicle, for example. Internal combustion engines having multiple cylinder banks are known. In such internal combustion engines, a value for the speed of the internal combustion engine is determined repeatedly over time.

SUMMARY OF THE INVENTION

The method and device according to the present invention for operating an internal combustion engine have the advantage over the related art that a characteristic value of an output quantity of the internal combustion engine is determined repeatedly over time and the time trend in the thus formed characteristic value for the output quantity of the internal combustion engine is filtered as a function of the operation of the cylinder banks. This makes it possible to eliminate unwanted fluctuations in the characteristic value of the output quantity of the internal combustion engine due to the mode of operation of the cylinder banks. It is possible in this way to operate functions of the internal combustion engine, which are provided with the characteristic value for the output quantity of the internal combustion engine in their time trend for further processing, independently of the aforementioned fluctuations and thus more conveniently. One might consider here, for example, an idling speed regulation as a function of the internal combustion engine.

Fluctuations in the time trend in the characteristic value for the output quantity of the internal combustion engine on the basis of simultaneous operation of different cylinder banks of the internal combustion engine in different operating modes are thus transparent for the functions of the internal combustion engine to which the characteristic value for the output quantity of the internal combustion engine is supplied in filtered form in its time trend, depending on this operation of the cylinder banks, i.e., these fluctuations are eliminated by the filtering and thus no longer have any effect on the aforementioned functions of the internal combustion engine, at least no significant effect.

It is advantageous if the time trend in the characteristic value for the output quantity of the internal combustion engine is filtered as a function of a firing frequency. This is because the aforementioned fluctuations in the time trend in the characteristic value for the output quantity of the internal combustion engine may include a frequency component that depends on the firing frequency, based on the operation of the cylinder banks.

One such frequency component is, for example, the firing frequency divided by the number of cylinder banks of internal combustion engine 1, so that a frequency component of the time trend in the characteristic value for the output quantity of the internal combustion engine is eliminated by filtering in an advantageous manner; this filtering corresponds to the firing frequency divided by the number of cylinder banks.

It is also advantageous if the time trend in the characteristic value for the output quantity of the internal combustion engine is averaged over a number of chronologically successive characteristic values for the output quantity of the internal combustion engine. This is a particularly simple and effective method of filtering to eliminate the unwanted fluctuations in the time trend in the characteristic value for the output quantity of the internal combustion engine occurring as a function of the operation of the cylinder banks.

Another advantage is achieved when the cylinder banks are fired in a manner different from that in a cyclic change and when the time trend in the characteristic value for the output quantity of the internal combustion engine is filtered as a function of a frequency of the camshaft revolution or a multiple of this frequency. This makes it possible to eliminate fluctuations in the time trend in the characteristic value for the output quantity of the internal combustion engine or at least to essentially eliminate them; such fluctuations result when the cylinder banks of internal combustion engine 1 are not fired cyclically in succession and may be undesired for the operation of the internal combustion engine or of the above-mentioned at least one function of the internal combustion engine that further processes the characteristic value of the output quantity of the internal combustion engine in its time trend.

In the simplest case, a value for the output quantity itself may be selected as the characteristic value for the output quantity of the internal combustion engine. This is adequately reliable in particular when the output quantity is detected once per firing period and the cylinder banks are operated at the same torque contribution.

However, if the output quantity is detected several times per firing period, the reliability of further processing of the characteristic value for the output quantity of the internal combustion engine is increased when an output quantity averaged over several values, in particular several chronologically directly successive values for the output quantity of the internal combustion engine, is formed as the characteristic value for the output quantity of the internal combustion engine.

It is adequately reliable for further processing of the characteristic value for the output quantity of the internal combustion engine if the value for the output quantity of the internal combustion engine is detected several times, in particular twice, per firing, and if the output quantity average is formed as the average over the values for the output quantity of the internal combustion engine detected per firing period. In this way, fluctuations in the detected values for the output quantity of the internal combustion engine which occur during a firing period are taken into account and at the same time are transparent for subsequent further processing of the detected values for the output quantity of the internal combustion engine but do not act there in the form of a fluctuation, so that the comfort, in particular the driving comfort, may be increased and/or is not impaired in an unwanted manner due to the functions of the internal combustion engine that further process the detected values for the output quantity of the internal combustion engine, e.g., in the form of the characteristic value for the output quantity of the internal combustion engine.

DETAILED DESCRIPTION

Figure 1:
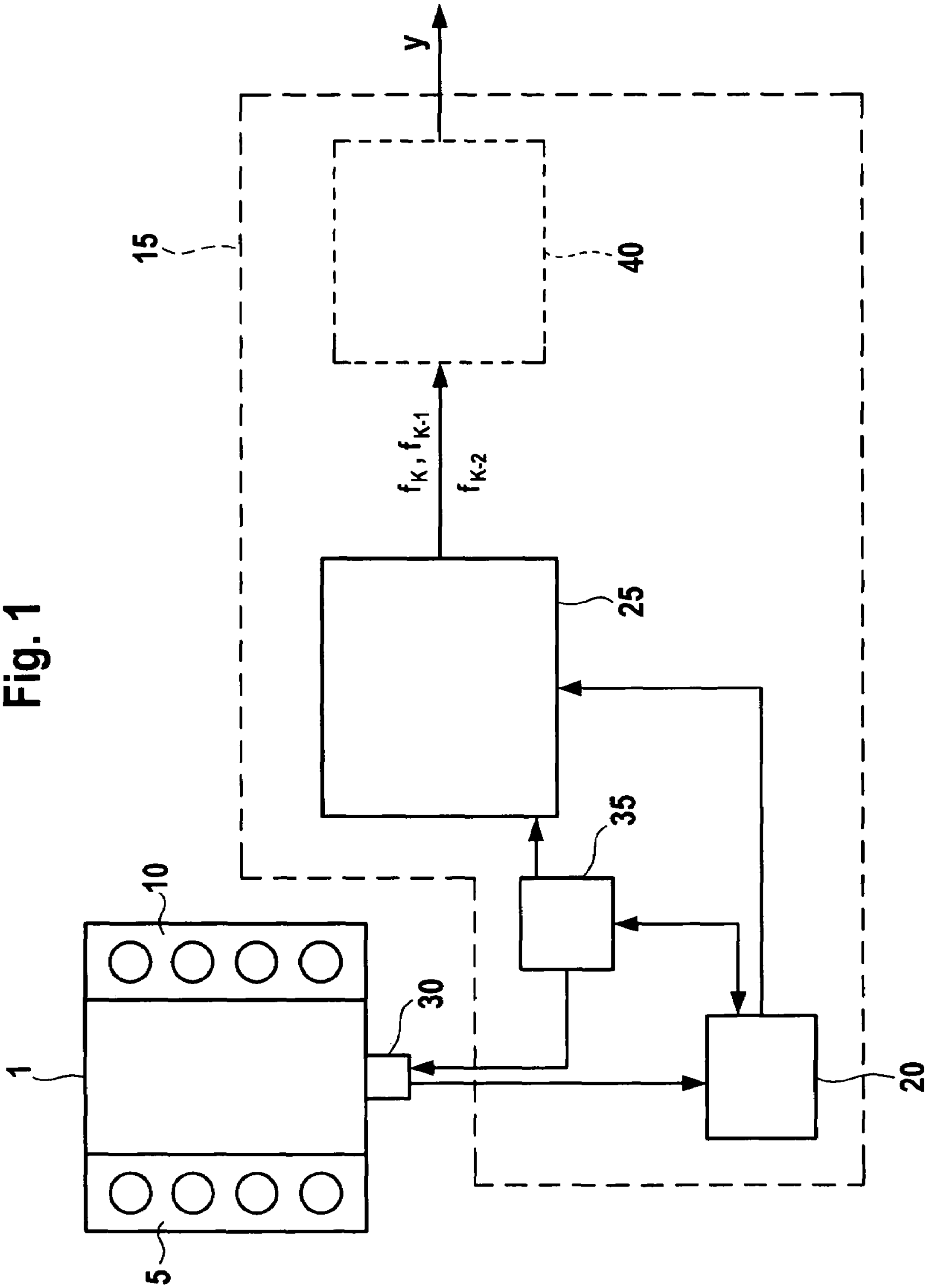
FIG. 1 shows a function diagram to explain the method according to the present invention and the device according to the present invention.

FIG. 1 shows an internal combustion engine 1, which drives a vehicle, for example. Internal combustion engine 1 may be designed, for example, as a gasoline engine or as a diesel engine. In the example according to FIG. 1, it includes two cylinder banks, namely a first cylinder bank 5 and a second cylinder bank 10, each of two cylinder banks 5, 10 including four cylinders in the example according to FIG. 1. In addition, sensor means 30 are arranged in the area of internal combustion engine 1, each detecting a value for the output quantity of the internal combustion engine at discrete points in time. The output quantity of the internal combustion engine may be, for example, a torque, a power, an engine speed, or a quantity derived from the torque and/or power and/or speed. For example, it shall be assumed below that the output quantity of internal combustion engine 1 detected by sensor means 30 is the engine speed of internal combustion engine 1. Sensor means 30 in this case are designed as engine speed sensors.

The values for the engine speed of internal combustion engine 1 detected at discrete points in time by engine speed sensor 30 in this way are sent to a device 15 according to the present invention and from there to a determination unit 20. Determination unit 20 forms a characteristic value from the values for the engine speed of internal combustion engine 1 supplied at discrete points in time. To this end, determination unit 20 is controlled by a control unit 35 of device 15. Control unit 35 also controls engine speed sensor 30 in that it specifies for engine speed sensor 30 the points in time at which engine speed sensor 30 should sample the engine speed of internal combustion engine 1, i.e., detect a corresponding value for the engine speed of internal engine 1. In the simplest case, control unit 35 then instructs engine speed sensor 30 to detect the engine speed once per firing period of internal combustion engine 1. The firing period of internal combustion engine 1 is the period between two successive firings of internal combustion engine 1. If only one cylinder of internal combustion engine 1 is operated, the firing period is the time interval between two successive firings of this cylinder. If multiple cylinders of internal combustion engine 1 are operated, two successive firings of internal combustion engine 1 may also take place in different cylinders of internal combustion engine 1, which need not be in the same cylinder bank. In this case, the firing period is in general the period of time between two successive firings independently of the particular cylinder fired in each case, i.e., simply the time interval between two consecutive firings, it being irrelevant in which cylinder(s) these two consecutive firings occur.

In the simplest case, control unit 35 instructs engine speed sensor 30 to detect only a single value for the engine speed of internal combustion engine 1 during a firing period, the same crankshaft position optionally always being specified per firing period by control unit 35 for a plurality of detection points in time in an advantageous manner. Determination unit 20 then forms the characteristic value for the engine speed of internal combustion engine 1 in the form of the particular value for the engine speed itself, as detected by engine speed sensor 30.

Alternatively, control unit 35 may instruct engine speed sensor 30 to detect the engine speed at several points in time per firing period. It is also possible to provide for these points in time for each firing period to be at the same crankshaft angles. In this case, determination unit 20 is prompted by control unit 35 to form a speed average for each firing period from all engine speed values received from engine speed sensor 30 for the corresponding firing period. During a firing period of internal combustion engine 1, the engine speed changes as do the engine torque and engine power because a firing period includes multiple operating phases of the fired cylinder, one operating phase of which is a compression phase having a lower engine speed, lower engine torque and lower engine power and another operating phase is a decompression phase having a higher engine speed, a higher engine torque and a higher engine power. This yields a fluctuation in the time trend in the engine speed, the engine torque and the engine power per firing period. With suitable triggering of engine speed sensor 30 by control unit 35 at the top dead center of the piston and at bottom dead center of the just fired cylinder, engine speed sensor 30 detects the engine speed at one or more characteristic locations in its time trend during a firing period. It is assumed below as an example that control unit 35 prompts engine speed sensor 30 to detect the engine speed twice per firing period. In an advantageous manner, control unit 35 then prompts engine speed sensor 30 to detect the engine speed at a point in time and/or at a crankshaft angle at which the cylinder to be fired at that moment is in a compression phase and at a point in time or a crankshaft angle at which the just fired cylinder is in a decompression phase. In this way, engine speed sensor 30 detects a relative high point and a relative low point of the engine speed per ignition period. These values are relayed to determination unit 20, which forms an average as the characteristic value for the engine speed of internal combustion engine 1 from the high points and low points of the engine speed received per firing period. The speed detection by engine speed sensor 30 takes place advantageously at equidistant points in time. If four cylinders of internal combustion engine 1 are operated, the firing interval between two immediately successively fired cylinders of internal combustion engine 1 equals 180° of the crankshaft angle, so that in the example described here, the time interval between two directly successive rotational speed measurements by engine speed sensor 30 is 90° of the crankshaft angle. If all eight cylinders of internal combustion engine 1 are in operation in the example according to FIG. 1, the firing interval between two cylinders of internal combustion engine 1 fired in direct succession equals 90° of the crankshaft angle in each case and the distance between two consecutive measurement points for rotational speed detection equals 45° of the crankshaft angle in each case. The relative maximum of the engine speed is measured in the compression phase before reaching the piston top dead center of the cylinder about to be fired and the relative minimum of the engine speed is measured in the decompression phase after piston top dead center of the just fired cylinder.

When it is stated that determination unit 20 forms the average (referring to the arithmetic mean here), alternatively this could also refer to the geometric mean or some other mean, of the engine speed values detected per firing period, this is advantageously to be understood to refer to the forming of a sliding average over the two most recently detected engine speed values, which may also fall in directly adjacent firing periods, but both include a relative high point and a relative low point of the engine speed. This sliding average over the most recently detected engine speeds by engine speed sensor 30 in each case yields a time trend in the thus formed characteristic value for the engine speed of internal combustion engine 1.

It is provided according to the present invention that the thus formed time trend for the characteristic value of the engine speed of internal combustion engine 1 is filtered as a function of the operation of cylinder banks 5, 10. This filtering is implemented by filter 25, which receives from determination unit 20 the characteristic value for the engine speed, e.g., in the form of the sliding average for the engine speed. Specifically during operation of internal combustion engine 1 having two cylinder banks 5, 10, fluctuations in speed and also fluctuations in the torque and power of internal combustion engine 1 are excited at half the firing frequency by different modes of operation of two cylinder banks 5, 10 at the same time. The firing frequency here corresponds to the inverse of the firing period, i.e., the inverse of the time interval between two immediately successive firings of internal combustion engine 1. This frequency component of half the firing frequency is also still present in the rotational speed average formed by determination unit 20. To eliminate this fluctuation by filtering via filter 25 for functions of internal combustion engine 1 which are not extremely time-critical, for example another sliding average may be formed by filter 25 over the two speed averages formed last by determination unit 20. Filtering via filter 25 should be omitted in the case of extremely time-critical functions of the internal combustion engine which are to be understood here as meaning that these functions must follow a change in the engine speed more rapidly than two firing periods. Such time-critical functions may be provided, e.g., by an idling regulator or a bucking damping function. Two cylinder banks 5, 10 may be operated in different modes at the same time, e.g., in that first cylinder bank 5 burns an air/fuel mixture in the particular cylinders in the conventional manner, e.g., for driving the vehicle, while second cylinder bank 10, is operated in regeneration mode to regenerate an NOx storage catalytic converter in an exhaust system of the internal combustion engine (not shown in FIG. 1) or for regeneration of a particulate filter in the case of a diesel engine also being operated in the exhaust line of the internal combustion engine. Different operating modes of the two cylinder banks 5, 10 may also occur when one of the two cylinder banks 5, 10 is operated in homogeneous mode and the other of two cylinder banks 5, 10 is operated in partially homogeneous operation or in a shift mode. At the same time, different operating modes of the two cylinder banks 5, 10 may also occur when only the cylinders of one of the two cylinder banks 5, 10 are operated, but the cylinders of the other of the two cylinder banks 5, 10 are shut down. In all cases in which the two cylinder banks 5, 10 of internal combustion engine 1 are operated at the same time in such different modes, the two cylinder banks 5, 10 usually yield different torque contributions and thus yield different engine speed characteristics over time. In this way, the fluctuation in speed described here occurs simultaneously in different operating modes at half the firing frequency in such operation of the two cylinder banks 5, 10. If both cylinder banks 5, 10 are operated in the same mode at the same time, there is no fluctuation in the speed at half the firing frequency or only a negligible fluctuation, but instead the speed fluctuation having a firing frequency already eliminated by determination unit 20 occurs in the form of the sliding average of the speed.

In the case of an internal combustion engine having more than two cylinder banks and operation of the internal combustion engine in which at least two of the cylinder banks of internal combustion engine 1 are operated in different modes at the same time, a fluctuation in speed, a fluctuation in torque, and a fluctuation in power of internal combustion engine 1 occur at a frequency corresponding to the firing frequency divided by the number of cylinder banks of internal combustion engine 1. This may be eliminated via filter 25 by averaging in filter 25 over the n speed averages most recently determined by determination unit 20, where n corresponds to the number of cylinder banks of internal combustion engine 1.

Control unit 35 controls filter 25 as a function of the operation of the cylinder banks of internal combustion engine 1 for suitable filtering. If both cylinder banks 5, 10 in the example according to FIG. 1 are operated at the same time in the same mode, control unit 35 triggers filter 25 so that the speed averages formed in determination unit 20 and sent on to filter 25 are not averaged further but instead are output as such by filter 25. Alternatively, averaging may also be activated permanently by filter 25. For the case when in more than two cylinder banks of internal combustion engine 1 all cylinder banks are operated at the same time in the same mode, control unit 35 instructs filter 25 to output the sliding speed averages received from determination unit 20 as such at its output and not to filter them further. In all the cases described here, control unit 35 receives information regarding the operating modes of the cylinder banks of combustion engine 1 in a manner known to those skilled in the art, and this information may already be known to control unit 35 due to the fact that it prompts these modes and triggers the corresponding cylinder banks of internal combustion engine 1 in FIG. 1 in a manner not depicted here.

Due to the averaging in filter 25 as described here, in the case when the cylinder banks of internal combustion engine 1 are operated at the same time in different modes, the time trend in the characteristic value for the engine speed of internal combustion engine 1 formed by determination unit 20 in the form of the speed average is filtered as a function of the firing frequency, a frequency component of the time trend in the characteristic value for the engine speed of combustion engine 1 formed by determination unit 20 being eliminated by filtering in filter 25, this frequency component corresponding to the firing frequency divided by the number of cylinder banks of internal combustion engine 1. Filtering may be accomplished by filter 25 in the manner described here particularly easily by averaging the time trend in the characteristic value for the engine speed of internal combustion engine 1 formed by determination unit 20 over a number of chronologically successive characteristic values for the engine speed of internal combustion engine 1, this number advantageously corresponding to the number of cylinder banks of internal combustion engine 1. For such filtering by averaging, a suitably designed digital filter may be used in the manner known to those skilled in the art.

For the case in which the cylinder banks of internal combustion engine 1 are not fired cyclically, i.e., in which in the firing and/or ignition of the cylinders there is no cyclic alternation among the cylinder banks of internal combustion engine 1, the result in the case of simultaneous different operation of at least two cylinder banks of internal combustion engine 1 is fluctuations in speed, torque, and power having camshaft frequency and integral multiples of this camshaft frequency up to a frequency component corresponding to the firing frequency divided by the number of cylinder banks of internal combustion engine 1. The camshaft frequency is the inverse of the period of time for one revolution of the camshaft of internal combustion engine 1. The camshaft frequency corresponds to half the crankshaft frequency because one revolution of the crankshaft corresponds to two revolutions of the crankshaft. In such a case, control unit 35 must cause filter 25 to eliminate these frequencies from the time trend in the characteristic value for the engine speed supplied by determination unit 20. These fluctuations may also be eliminated by a suitably designed digital filter in the manner known to those skilled in the art.

Depending on the operation of internal combustion engine 1 in which the cylinder banks of internal combustion engine 1 are fired simultaneously in the same mode, simultaneously in different modes, in cyclic alternation, or are not fired in cyclic alternation, different filtering of the time trend received by determination unit 20 in filter 25 in the characteristic value for the speed of the internal combustion engine is necessary. To this end, control unit 35 is able to switch as a function of the operation of internal combustion engine 1 between different filter functions of filter 25 which perform the filtering required for the instantaneous operation of internal combustion engine 1 in the manner described previously. The filtered time trend in the characteristic value for the speed of internal combustion engine 1 is output by filter 25 and may then be sent to various other regulators, characteristic curves, and engine characteristic maps of the internal combustion engine (not shown in FIG. 1) which must rely on speed information.

Figure 2:
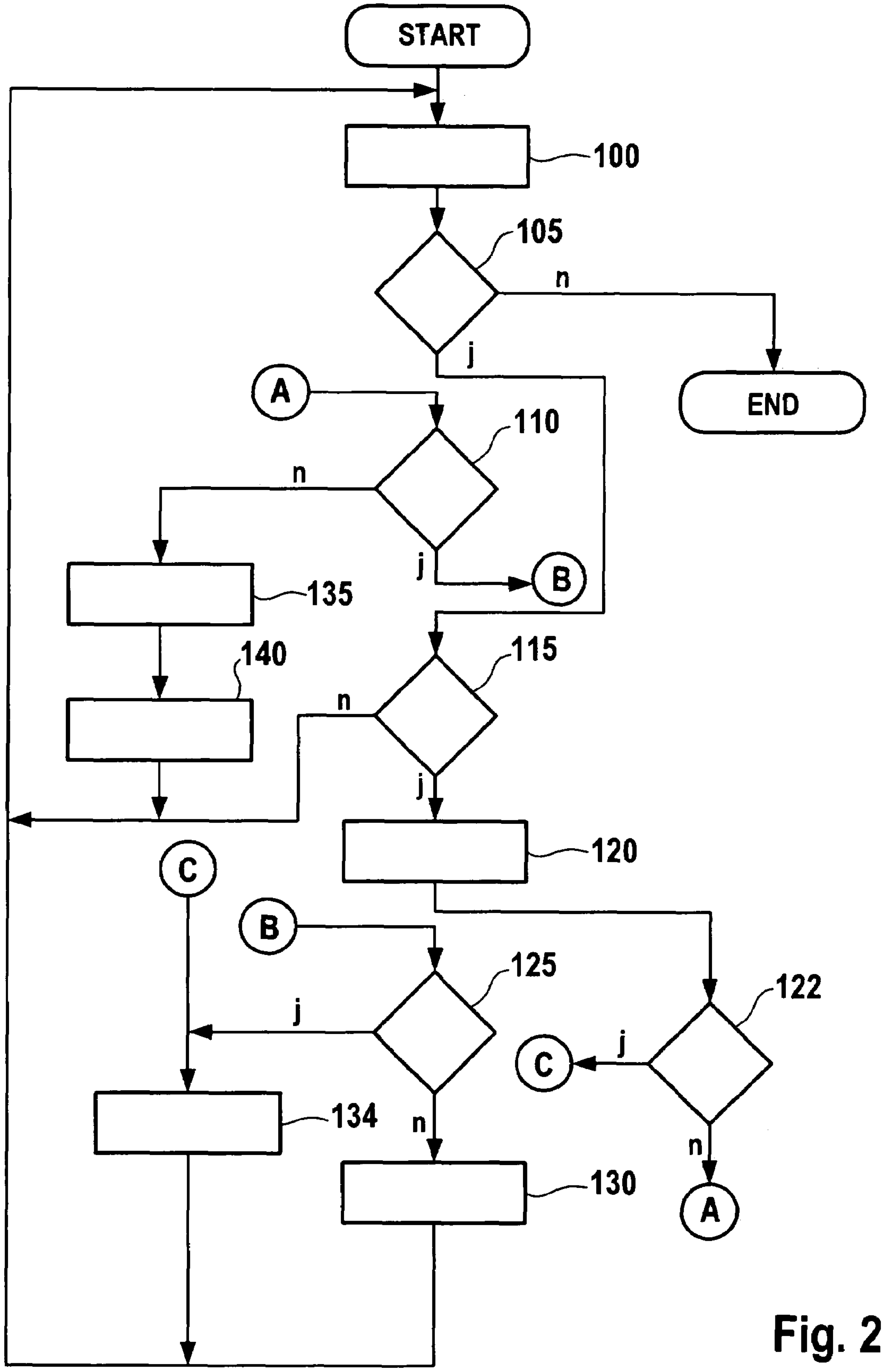
FIG. 2 shows an example of a flow chart to illustrate the method according to the present invention.

FIG. 2 shows a flow chart for an example of a sequence of the method according to the present invention. After the start of the program, which may coincide with the start of internal combustion engine 1, for example, control unit 35 causes the detection of the engine speed of internal combustion engine 1 by engine speed sensor 30 at a point in time and/or a corresponding crankshaft angle suitable in the manner described above. It then branches to a program point 105.

At program point 105, control unit 35 checks whether internal combustion engine 1 is still running. If this is the case, the program branches to a program point 115; otherwise the program is terminated.

At program point 115, control unit 35 checks whether enough speed values have been detected by engine speed sensor 30 at the current point in time and relayed to determination unit 20, which permits the formation of a characteristic value for the engine speed and the filtering of this characteristic value by filter 25. In the case of the above-described filtering by averaging, 2n speed values detected by engine speed sensor 30 in succession are necessary for this filtering in the case of n cylinder banks of internal combustion engine 1. If there are enough speed values, the program branches to a program point 120; otherwise it branches back to program point 100 and engine speed sensor 30 is triggered by control unit 35 to determine the next speed value at the next specified point in time and/or the next crankshaft angle. The specified points in time and/or crankshaft angles for ascertaining the engine speed may be preselected in the manner described above to detect relative high and low points of the time trend in the engine speed via engine speed sensor 30.

At program point 120, control unit 35 causes determination unit 20 to form a speed average as the characteristic value for the speed of internal combustion engine 1 from the speed values detected last by engine speed sensor 30 during the duration of a firing period. In the example described above, the average over the two last speed measurements by engine speed sensor 30 is triggered by control unit 35 in determination unit 20. These two speed values represent a relative high point and a relative low point of the time trend in the speed, as already explained, the measurement frequency and/or sampling frequency of engine speed sensor 30 in this example being selected to be equal to twice the firing frequency. As an alternative, it may then also be selected to be equal to the firing frequency, in which case only one measured value is available per firing period which corresponds at the same time to the characteristic value for the speed. However, the measurement frequency and/or sampling frequency may also be greater than twice the firing frequency, in which case more than two measured speed values are supplied by engine speed sensor 30 per firing period; determination unit 20 must then take the average of these measured values to form the speed average as the characteristic value for the speed of internal combustion engine 1.

In the latter case, for example, one or more other crankshaft angles may also be preselected in addition to the crankshaft angle for the relative high point and the crankshaft angle for the relative low point of the time trend in the engine speed in such a way that engine speed sensor 30 should detect the engine speed for these crankshaft angles, this specification optionally being random. Nevertheless it is less complex if the crankshaft angles for which engine speed sensor 30 is to detect and/or sample the engine speed are equidistant. After program point 120, the program branches to a program point 122. At program point 122, control unit 35 checks whether an extremely time-critical function (as described above) of internal combustion engine 1 utilizing the speed information at the output of filter 25 is active. If this is the case, the program branches to a program point 134; otherwise it branches to a program point 110. At program point 134, control unit 35 causes filter 25 to output the sliding speed average received by determination unit 20, unfiltered at its output. The program then branches back to program point 100 and engine speed sensor 30 is triggered by control unit 35 to detect the next speed value.

At program point 110, control unit 35 checks whether firing of the cylinder banks of internal combustion engine 1 has been currently set in cyclic alternation as the operating mode of internal combustion engine 1 or the cylinder banks of internal combustion engine 1. If this is the case, the program branches to a program point 125; otherwise it branches to a program point 135.

At program point 125, control unit 35 checks whether all cylinder banks of internal combustion engine 1 are being operated in the same mode at the same time. If this is the case, the program branches to program point 134; otherwise it branches to a program point 130.

At program point 130, control unit 35 causes filter 25 to average over the n sliding speed averages most recently received from determination unit 20, where n denotes the number of cylinder banks of internal combustion engine 1. The thus formed sliding average represents a filtered characteristic value for the speed of internal combustion engine 1 and is made available at the output of filter 25 for further processing. The program subsequently branches back to program point 100.

At program point 135, control unit 35 determines the spectral components of the sliding speed average determined by determination unit 20 in time from the sliding speed averages formed last by determination unit 20 over one camshaft revolution period. This may take place via a Fourier analysis, for example. The program subsequently branches to a program point 140.

At program point 140, control unit 35 causes filter 25 to eliminate fluctuations occurring according to Fourier analysis at program point 135, optionally with camshaft frequency as the inverse of a camshaft revolution period and also at an integral multiple of this camshaft frequency and a frequency corresponding to the firing frequency divided by the number of cylinder banks of internal combustion engine 1. The signal filtered accordingly is made available at the output of filter 25 for further processing. The program then branches back to program point 100 and engine speed sensor 30 is prompted to detect the next speed value by control unit 35. Program step 135 may also be omitted, and then at program point 140 filter 25 may be prompted in general by control unit 35 to eliminate spectral components in the camshaft frequency, integral multiples of the camshaft frequency and a frequency corresponding to the firing frequency divided by the number of cylinder banks of internal combustion engine 1 from the time trend in the characteristic value for the speed of internal combustion engine 1, this time trend having been received by determination unit 20, and to make this available at the output of filter 25.

The filter functions in filter 25 may also be linked to an estimation method, e.g., a linear or quadratic estimation method to compensate for the time lag caused by the filter functions.

In such an estimation method, instantaneous output value $f_K$ of filter 25 and one or more previous output values $f_{K-1}$, $f_{K-2}$ of filter 25 are needed. The equation for a linear estimation method is as follows, for example:

$$y=a_0*f_K+a_1*f_{K-1} \quad (1)$$

The equation for a quadratic estimation method is as follows, for example:

$$y=a_0*f_K+a_1*f_{K-1}+a_2*f_{K-2} \quad (2)$$

Coefficients $a_0$, $a_1$, $a_2$ are determined in a method known to those skilled in the art as a function of the filter algorithm in filter 25. At the output of the estimation method supplied with the output values of filter 25, estimate y determined according to equation (1) or equation (2) is then available. The estimation method, shown by dashed lines in FIG. 1, is represented by reference numeral 40 as an optional module at the output of filter 25 and still belongs to device 15.

What is claimed is:

1. A method for operating an internal combustion engine having multiple cylinder banks, comprising:

determining repeatedly over time a characteristic value of an output quantity of the internal combustion engine, in order to produce a time trend of the characteristic value; and filtering the time trend for an output quantity of the internal combustion engine as a function of an operation of the cylinder banks.

2. The method as recited in claim 1, wherein the filtering is performed as a function of a firing frequency.

3. The method as recited in claim 1, further comprising:

eliminating a frequency component of the time trend by filtering; and dividing the output quantity corresponding to the firing frequency by a number of the cylinder banks.

4. The method as recited in claim 3, further comprising:

averaging the time trend over a number of successive characteristic values for the output quantity of the internal combustion engine.

5. The method as recited in claim 1, further comprising:

firing the cylinder banks in a manner that differs from a cyclic alternation; and filtering the time trend as a function of a frequency of one of a camshaft revolution and a multiple of the frequency.

6. The method as recited in claim 1, further comprising:

selecting a value for the output quantity as the characteristic value.

7. The method as recited in claim 1, further comprising:

forming the characteristic value as an output quantity average averaged over multiple values for the output quantity of the internal combustion engine.

8. The method as recited in claim 7, further comprising:

detecting repeatedly a value for the output quantity of the internal combustion engine per firing period; and forming the output quantity average as an average over values detected per firing period for the output quantity.

9. The method as recited in claim 8, wherein the detecting is performed twice.

10. The method as recited in claim 7, wherein the multiple values include chronologically directly successive values.

11. The method as recited in claim 1, wherein the internal combustion engine is in a motor vehicle.

12. A device for operating an internal combustion engine having multiple cylinder banks, comprising:

an arrangement for determining repeatedly over time a characteristic value of an output quantity of the internal combustion engine, in order to produce a time trend of the characteristic value; and an arrangement for filtering the time trend for an output quantity of the internal combustion engine as a function of an operation of the cylinder banks.

* * * * *